United States Patent [19]

Brown

[11] Patent Number: 5,714,068
[45] Date of Patent: Feb. 3, 1998

[54] INLET DEVICE FOR LARGE OIL FIELD SEPARATOR

[75] Inventor: Michael R. Brown, Tulsa, Okla.

[73] Assignee: National Tank Company, Houston, Tex.

[21] Appl. No.: 706,225

[22] Filed: Sep. 3, 1996

Related U.S. Application Data

[60] Provisional application No. 60/005,440, Oct. 6, 1995.

[51] Int. Cl.[6] ..................................................... C02F 1/40
[52] U.S. Cl. ........................ 210/519; 210/538; 210/541
[58] Field of Search .................................. 210/519, 538, 210/540, 541, 542, DIG. 5

[56] References Cited

U.S. PATENT DOCUMENTS

| | | | |
|---|---|---|---|
| 2,624,463 | 1/1953 | Freese | 210/519 |
| 4,014,791 | 3/1977 | Tuttle | 210/540 |
| 4,400,280 | 8/1983 | Larsson et al. | 210/519 |
| 4,486,203 | 12/1984 | Rooker . | |
| 4,581,120 | 4/1986 | Sublette . | |
| 4,755,194 | 7/1988 | Rooker et al. . | |
| 5,073,266 | 12/1991 | Ball, IV | 210/519 |
| 5,204,000 | 4/1993 | Steadman et al. | 210/519 |
| 5,505,860 | 4/1996 | Sager | 210/538 |

FOREIGN PATENT DOCUMENTS

0615776 A1   9/1994   European Pat. Off. .

*Primary Examiner*—Christopher Upton
*Attorney, Agent, or Firm*—Head, Johnson & Kachigian

[57] ABSTRACT

An inlet momentum absorber for passing an oil/water/gas mixture into a separator vessel having an inlet nozzle that extends through the vessel wall into the interior thereof, and a nozzle axis. A dish-shaped deflector is supported within the vessel adjacent to the deflector being intersected by the nozzle axis. A plurality of closely spaced apart cylindrical posts are arranged in an enlarged circumferential pattern defining a dispersing area within the vessel, the dispersing area being formed equilaterally around the nozzle axis. The closely spaced cylindrical posts provide a multitude of tortuous paths through which the oil/water/gas mixture flows from the dispersing area into the interior of the vessel. The tortuous paths are free of sharp edges to thereby minimize shearing of dispersed droplets.

10 Claims, 3 Drawing Sheets

INLET DEVICE FOR LARGE OIL FIELD SEPARATOR

REFERENCE TO PENDING APPLICATIONS

This application is based on Provisional Application 60\005,440 filed Oct. 6, 1995.

REFERENCE TO MICROFICHE APPENDIX

This application is not referenced in any microfiche appendix.

BACKGROUND OF THE INVENTION

Inlet systems are employed in the petroleum industry for passing oil/water/gas mixtures into separation vessels. When such mixtures flow from a pipeline into a separation vessel the flow is not normally uniform and consistent, but can at times be, and frequently is, highly non-uniform, sometimes referred to in the petroleum industry as "slugging". This means that slugs of oil/gas/water mixtures, propelled by gas within the system, enter a separation vessel at high velocities. A slug of liquid, separated by gas in a flow stream, can represent substantial kinetic energy, which kinetic energy must be absorbed by the vessel inlet system. For this reason others have devised inlet momentum absorbers intended to absorb the high kinetic energy loads frequently encountered in fluid processing in a way so as to prevent damage to the separator vessel and, in addition, in a way to minimize shearing of droplets contained in the liquid emulsion.

For background information relating to impact momentum absorbers for separator vessels reference may be had to U.S. Pat. No. 4,486,203 entitled "Inlet Momentum Absorber For Fluid Separation" issued Dec. 4, 1984. This patent is incorporated herein by reference.

The following previously issued United States patents provide good sources of information about separator vessels which are of the type that can effectively make use of the inlet momentum absorber of this disclosure:

| PATENT NO | INVENTOR | TITLE |
| --- | --- | --- |
| 4,581,120 | Sublette | Method and Apparatus For Separating Oilfield Emulsions |
| 4,755,194 | Rooker et al | Method For Introducing A Mixture of Gas and Liquid Into A Separator |
| 5,073,266 | Ball, IV | Apparatus For Separating Commingled Heavier and Lighter Immiscible Liquids |

SUMMARY OF THE INVENTION

An inlet momentum absorber is provided for use as a part of a separation vessel into which an oil/gas/water mixture is passed, the vessel being a portion of a system for separating components of the mixture. "Mixture" as used herein means an oil/gas/water mixture as commonly encountered in the petroleum industry. Such mixtures can be oil-in-water or water-in-oil, usually commingled with gas.

The inlet momentum absorber for passing a mixture into a separation vessel of this disclosure includes an inlet nozzle extending into the vessel, the nozzle having an imaginary nozzle axis. A dish-shaped deflector is supported within the vessel adjacent and slighlty below the inlet nozzle. The nozzle axis intersects the deflector at its center.

A plurality of closely spaced apart cylindrical posts are arranged in an enlarged circumferential pattern defining a vertical cylindrical dispersing area around the nozzle axis. A mixture entering through the inlet nozzle is deflected by the deflector and passes into the dispersing area. From the dispersing area the mixture passes out of the momentum absorber by flowing between the cylindrical posts. The posts are arranged so that the flow paths between them are circuitous or more properly tortuous, that is, non-linear. The emulsion flows through such tortuous paths between the dispersing area and the main vessel interior. The cylindrical posts serve to disperse the mixture entering into the interior of the vessel in a manner that eliminates sharp edges or protrusions that would cause shearing of oil droplets.

A cylindrical shroud is supported within the vessel concentric with and surrounding the inlet nozzle. The shroud has an open lower end. An annular passageway is formed between the shroud and the deflector through which the mixture flows as it passes from the inlet nozzle into the dispersing area.

The plurality of cylindrical posts must be supported within the vessel, and this is preferably accomplished by use of a distal tube sheet structurally supported to the interior of the vessel, the distal tube sheet being in alignment with and perpendicular to the inlet nozzle axis. A second end portion of each of the posts is supported to the distal tube sheet. A proximal tube sheet is also supported to the interior of the vessel and is exterior of the shroud. The proximal tube sheet is in a plane substantially perpendicular to the inlet tube axis and therefore, is also parallel to the distal tube sheet. A first end portion of each of the posts is supported by the proximal tube sheet.

A column, preferably formed of tubular steel, is the preferred means of supporting the deflector. The column has a first end attached to the deflector and a second end supported on the interior floor of the vessel. The column is preferably coaxial with the inlet nozzle axis. The column must be sturdy since it must absorb the significant kinetic energy of slugs of liquid that flow into the separation vessel.

When gas is present in a liquid flow line, liquid flow is typically intermittent and characterized by slugging and foaming. Gas in a liquid flow line tends to cause the liquid to move in batches, that is, flow at intermittent accelerated flow rates. When pushed by gas, a slug of liquid entering a separation vessel carries significant kinetic energy which must be absorbed by the vessel inlet system. Further, the flow must then be distributed within the vessel in a way to minimize shearing and to thereby augment eventual separation of immiscible components of the fluid.

A better understanding of the invention will be obtained from the following description of the preferred embodiments and claims, taken in conjunction with the attached drawings.

DESCRIPTION OF THE DRAWINGS

FIG. 1 is illustrative of the inlet momentum absorber as applied to a central portion of an elongated cylindrical horizontal vessel, but it is understood that the orientation of the inlet momentum absorber is not limited. While the preferred arrangement is to introduce the mixture downwardly through an opening in the upper portion of an elongated horizontal vessel, the invention can be practiced by use of an inlet nozzle that extends into a side wall or end wall of a vessel.

DETAILED DESCRIPTION OF THE PREFERRED EMBODIMENTS

Figure 1:
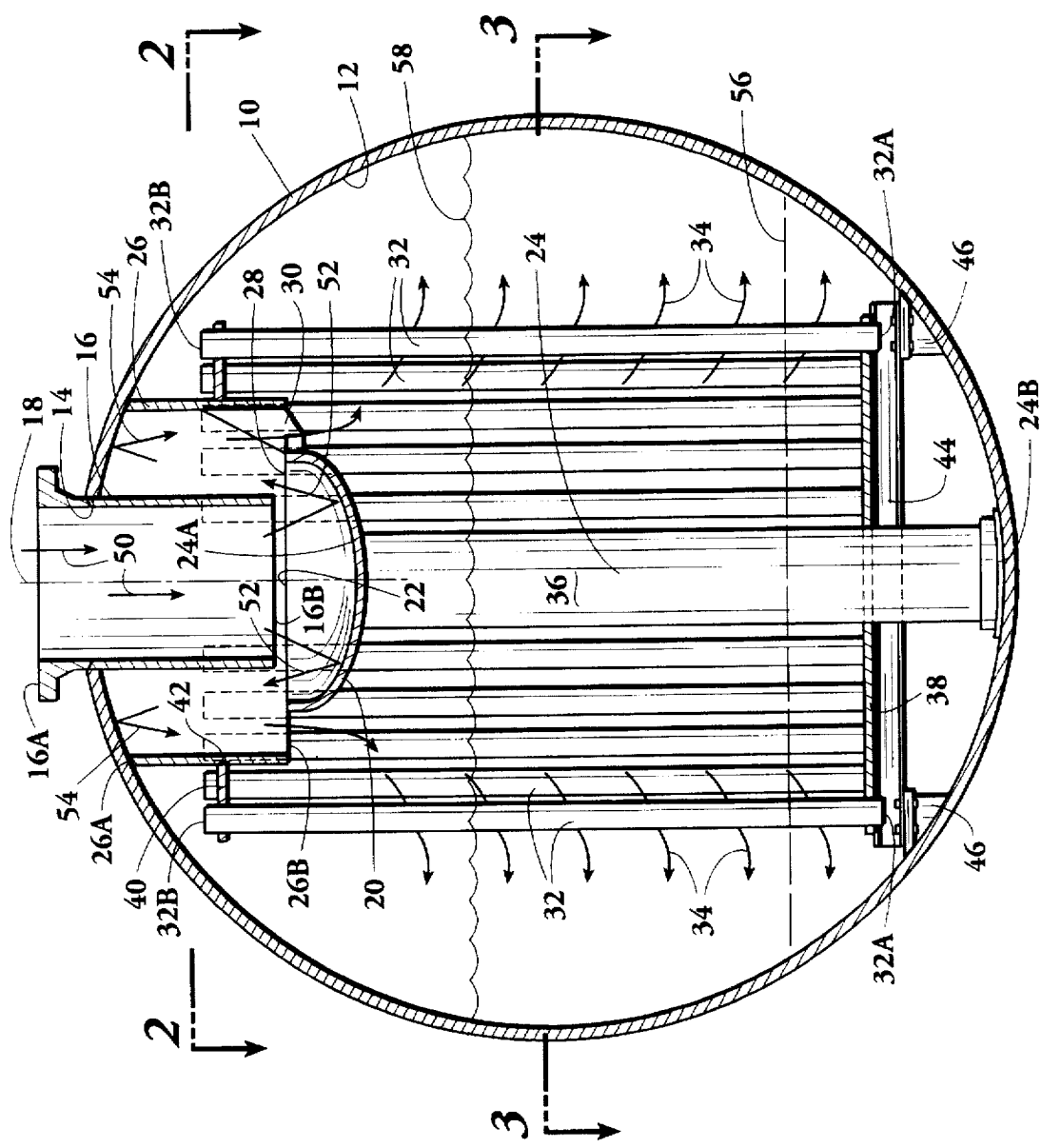
FIG. 1 is an elevational cross-sectional view of an elongated cylindrical separator vessel showing the inlet momentum absorber of this invention by which a water/oil/gas mixture is introduced into the separator.

Referring to the drawings and first to FIG. 1, a separation vessel is shown in cross-section and indicated by the numeral 10. Vessel 10 is illustrated herein as being cylindrical and elongated and horizontally extending, which is a typical type of separation vessel as used in the petroleum industry. However, this invention is not limited to the specific shape of vessel 10 nor the specific orientation of the momentum absorber which will be described. Vessel 10 has an interior surface 12 and an opening 14 which, when the vessel is elongated and horizontal, is preferably formed in the top of vessel 10 as indicated. Vessel 10 is supported on the earth, but the means of support is well known and not illustrated.

Positioned within opening 14 is an inlet nozzle 16 having an outer end 16A and an inner end 16B. Nozzle 16 may extend, and is illustrated as extending, for a distance within the interior of vessel 10. The nozzle has an imaginary axis 18. Outer end 16A is shown to have an integral circumferential flange indicative of one way the nozzle can be connected to a fluid carrying conduit (not shown).

Positioned below inlet nozzle 16 is a deflector 20. Deflector 20 is dish or bowl shaped and has an upper circumferential edge 22. Deflector 20 may be formed from a tank shell end, that is, an item of standard commerce utilized for manufacturing elongated cylindrical vessels, or deflector 20 may be especially configured to meet the requirements of the invention. The deflector upper edge 22 is positioned slightly below inlet nozzle lower edge 16B. Deflector 20 is centrally positioned with respect to inlet nozzle 16, that is, deflector 20 is intercepted symmetrically by inlet nozzle axis 18.

Deflector 20 is supported by column 24 that can be fabricated from a length of strong steel pipe. Column 24 has a first end 24A that is attached to deflector 20 and a second end 24B that is secured to the vessel interior surface 12.

Column 24 is in coaxial alignment with inlet nozzle axis 18.

Surrounding inlet nozzle 16 is a cylindrical shroud 26 having a first end 26A that is attached to vessel interior surface 12. The shroud is supported coaxially with inlet nozzle axis 18 and has a second end 26B that preferably is in a plane parallel to the planar lower end 16B of inlet nozzle 16. In the arrangement illustrated cylindrical shroud second end 26B is slightly displaced from nozzle inlet end 16B although it could be co-planar, or the nozzle end 16B could extend slightly beyond the plane of shroud second end 26B.

A first annular area 28 is provided between the exterior of inlet nozzle 16 and the upper edge 22 of deflector 20. A second annular area 30 is formed between the exterior of deflector 20 and cylindrical shroud 26. The functions of these annular areas 28 and 30 will be described subsequently. The use of an inlet nozzle, a deflector and a shroud within a vessel is known. This invention is concerned with a flow diffusion structure surrounding these elements.

Figure 2:
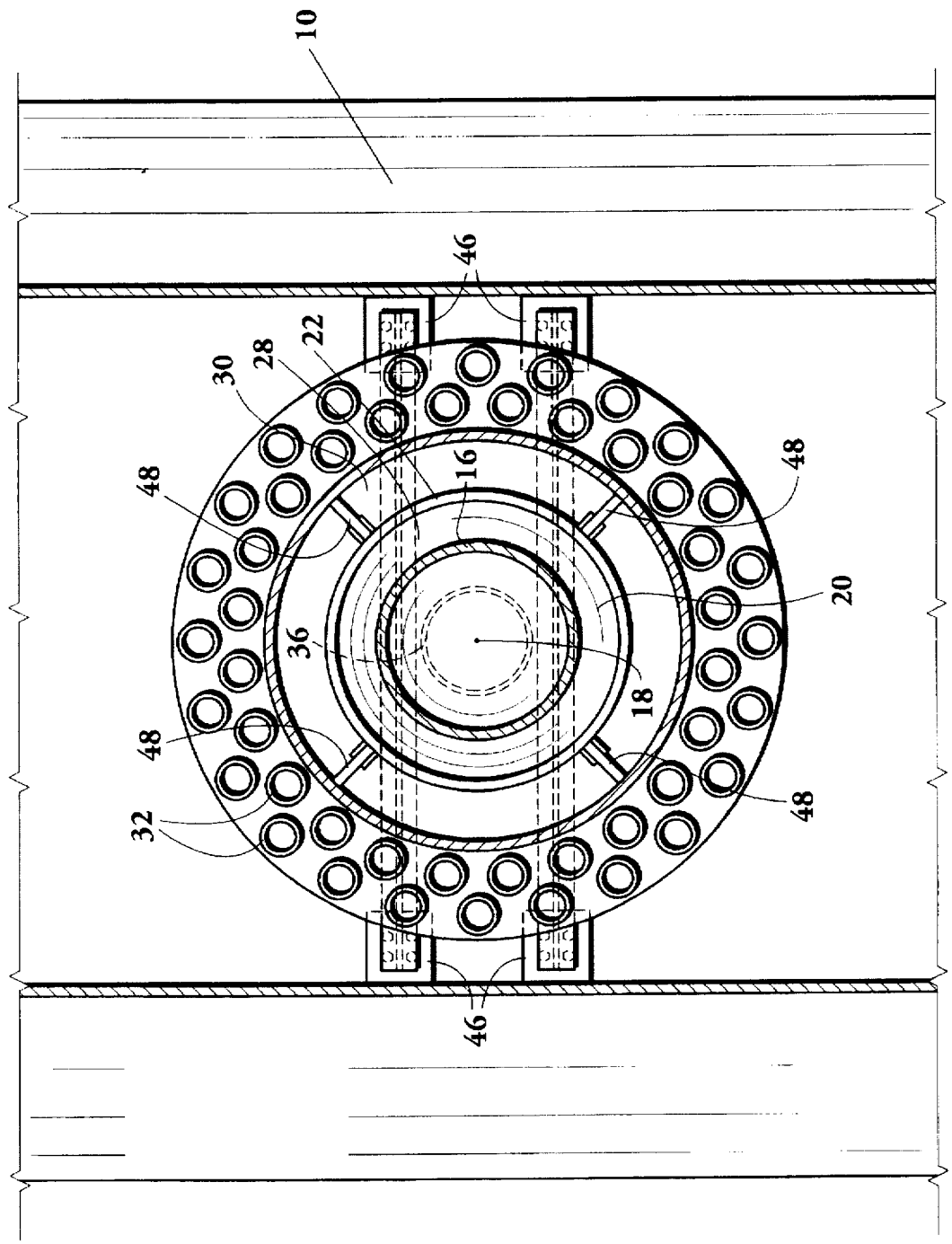
FIG. 2 is a cross-sectional view, taken along the line 2—2 of FIG. 1, showing more details of the inlet momentum absorber.

Spaced from and positioned around the axis of inlet nozzle 16 are a plurality of closely spaced apart cylindrical posts 32. In the preferred arrangement, the cylindrical posts are spaced in circular patterns about inlet nozzle axis 18 and, as illustrated in FIGS. 2 and 3, posts 32 are preferably arranged in a plurality of circular patterns (2 being shown) and wherein the position of posts 32 in one circular pattern is displaced from the posts in the adjacent circular pattern.

By offsetting the posts relative to each other in circular patterns, tortuous or circuitous flow paths are provided as indicated by arrows 34. Flow paths 34 may be described as tortuous, circuitous or non-linear, that is, the flow paths require fluid flow to change directions as it passes between posts 32.

Figure 3:
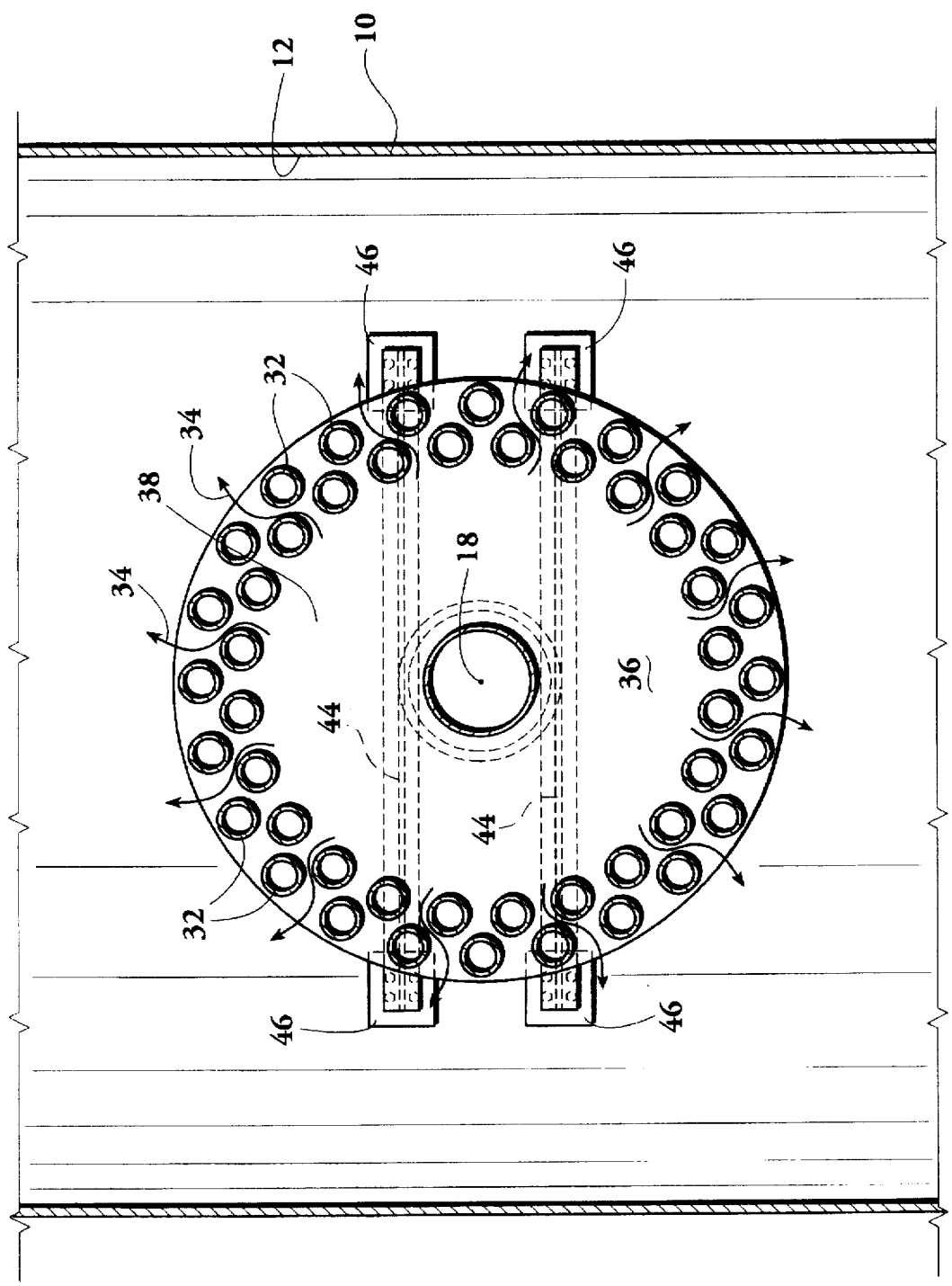
FIG. 3 is a cross-sectional view, taken along the line 3—3 of FIG. 1, showing still more details of the absorber.

The arrangement of posts 32 is such as to define, interiorly of the posts, a dispersing area 36 as best seen in FIG. 3. Fluid entering vessel 10 is first discharged into dispersing area 36 and then passes between posts 32 as the fluid exits the dispersing area into the main interior section of the vessel.

Posts 32 are supported by a distal tube sheet 38 and a proximal tube sheet 40. That is, the second end portions 32A of the posts are affixed to distal tube sheet 38. This can be accomplished by providing an opening in tube sheet 38 for each post with each post extending through an opening. In like manner, the proximal tube sheet 40 receives the first end portions 32B of the post. Proximal tube sheet 40 is annular in configuration and has an internal opening 42 dimensioned to receive the exterior surface of shroud 26. Proximal tube sheets 40 are welded to shroud 26. Both proximal and distal tube sheets 38 and 40 are preferably supported perpendicular to inlet nozzle axis 18.

Posts 32 can be effectively formed of tubular steel material, such as steel pipe cut to proper lengths and welded to the tube sheets. If formed of tubular steel, the posts are preferably left open at each end. Distal tube sheet 38 is supported by transverse structural members 44 as seen in FIGS. 1 and 3 which are attached to brackets 46 secured to the interior surface of vessel 10.

As shown in FIG. 2, support brackets 48 are positioned between shroud 26 and the exterior of deflector 20 to stabilize deflector 20.

The mixture, which is typically in the form of an oil-in-water mixture or a water-in-oil mixture and is usually combined with gas, enters the vessel through inlet nozzle 16. Inlet fluid flow arrows being indicated by the numeral 50. The mixture flows out the lower end 16B of inlet nozzle 16 and impacts against the interior of deflector 20. The mixture is deflected by deflector 20 upwardly as indicated by arrows 52, the mixture being directed into the interior of shroud 26. The fluid then flows, as indicated by arrows 52, through first annular area 28. After entering the interior of shroud 26 the mixture flow, some of which impinges against the upper interior surface 12 of vessel 10 within the confines of shroud 26, is deflected back downwardly as indicated by arrows 54. The mixture passes out of shroud 26 through second annular area 30 and into dispersing area 36 as defined by the circumferentially oriented rows of posts 32 and the proximal and distal tube sheets.

From within area 36 the mixture flows into the main interior section of vessel 10 by flow paths indicated by arrows 34 as previously mentioned.

The inlet momentum absorber as described herein is configured to be structurally sound so as to be able to absorb the high kinetic energy encountered in pulsating or surging mixture flows. The mixture is at least partially separated within the interior of the vessel, water gathering in the lower portion with oil above, the oil/water interface being indicated by the numeral 56. Gas gathers in the upper portion of the vessel, the gas/oil interface being indicated by the numeral 58. Interface levels 56 and 58 are maintained by level controls (not seen) that are well known and standard in the industry. Water from below oil/water interface 56 is drawn off through a water outlet (not shown); oil is drawn from the oil appearing between oil/water interface 56 and the oil/gas interface 58 by a separate oil outlet (not shown); and gas within the interior of the vessel above oil/gas interface 58 is drawn off through a gas outlet (not shown) in the upper portion of vessel 10. The means of separating and withdrawing separated components of an oil/gas/water mixture are all within the known technology of the industry and therefore are not part of this invention which is concerned only with providing an inlet momentum absorber as a fluid inlet into the vessel.

The system described herein provides flow paths for an oil/gas/water mixture to move from dispersing area 36 into the interior of the vessel in which there are no sharp edges to cause shearing. By minimizing shearing of dispersed droplets, the effectiveness of separation of the mixture within the vessel is augmented. Further, the distribution around the periphery of the multiplicity of posts 32 slows down local velocities and minimizes turbulence, allowing for more effective subsequent separation to occur.

The benefits of the inlet momentum absorber as described herein may be summarized as follows:

a) ruggedness against mechanical loadings;

b) endurance against long term wear, tear and fatigue;

c) low shear to the process fluid, minimizing emulsification and foaming;

d) low turbulence of fluid leaving the inlet momentum absorber; and e) a good distribution of both liquid and gas phases leaving the inlet momentum absorber.

The claims and the specification describe the invention presented and the terms that are employed in the claims draw their meaning from the use of such terms in the specification. The same terms employed in the prior art may be broader in meaning than specifically employed herein. Whenever them is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed:

1. An inlet momentum absorber for passing an oil/water/gas mixture into a separation vessel, comprising:

an inlet nozzle extending into the vessel and having a nozzle axis;

a dish-shaped deflector supported with the vessel adjacent to said inlet nozzle and intersected by said nozzle axis; and a plurality of closely spaced apart cylindrical posts arranged in an enlarged circumferential pattern defining a dispersing area around said nozzle axis and providing a plurality of tortuous paths leading out of the dispersing area, a mixture entering through said inlet nozzle being deflected by said deflector into said dispersing area, the mixture passing through said tortuous paths between said cylindrical posts and into the interior of the vessel.

2. An inlet momentum absorber according to claim 1 including:

a cylindrical shroud supported within the vessel concentrically with and surrounding said inlet nozzle, the shroud having an open lower end, an annular passageway being formed between said inlet nozzle and said shroud through which the mixture passes into said dispersing area.

3. An inlet momentum absorber according to claim 2 wherein said shroud is supported to an upper interior surface portion of the vessel.

4. An inlet momentum absorber according to claim 2 including:

a proximal tube sheet affixed exteriorally of said shroud and extending in a plane perpendicular to said inlet tube axis, a first end portion of each of said posts being supported to the proximal tube sheet.

5. An inlet momentum absorber according to claim 2 wherein said inlet nozzle has an open discharge end positioned within said vessel and wherein said deflector has a circumferential substantially planar inlet edge, the plane of the deflector inlet edge being substantially parallel to said inlet nozzle discharge end and the plane of said deflector inlet edge being substantially parallel with a plane of said shroud open lower end.

6. An inlet momentum absorber according to claim 1 wherein said cylindrical posts are arranged in a plurality of concentric patterns, the posts in one pattern being displaced in orientation from the posts in an adjacent pattern forming non-linear flow paths between adjacent posts through which the mixture passes out of said dispersing area.

7. An inlet momentum absorber according to claim 1 including:

a distal tube sheet supported within said vessel perpendicular to and in alignment with said inlet tube axis, a second end portion of each of said posts being supported by said distal tube sheet.

8. An inlet momentum absorber according to claim 1 wherein said inlet nozzle has an open discharge end positioned within said vessel and wherein said deflector has a circumferential substantially planar inlet edge, the plane of the deflector inlet edge being spaced from and substantially parallel to said inlet nozzle discharge end.

9. An inlet momentum absorber according to claim 1 including a column having a second end supported to an interior portion of said vessel and a first end portion supporting said deflector.

10. An inlet momentum absorber according to claim 9 wherein said column is substantially coaxial with said inlet nozzle.

\* \* \* \* \*